US012717654B2

(12) United States Patent

Pan et al.

(10) Patent No.: US 12,717,654 B2

(45) Date of Patent: Aug. 25, 2026

(54) OBJECT PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Anqun Pan, Shenzhen (CN); Liangchun Xiong, Shenzhen (CN); Gang Li, Shenzhen (CN); Sheng Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 932 days.

(21) Appl. No.: 18/062,308

(22) Filed: Dec. 6, 2022

(65) Prior Publication Data

US 2023/0098963 A1 Mar. 30, 2023

Related U.S. Application Data

(63) Continuation of application No. PCT/CN2022/086091, filed on Apr. 11, 2022.

(30) Foreign Application Priority Data

May 19, 2021 (CN) ......................... 202110547589.7

(51) Int. Cl.

*G06F 9/46* (2006.01)
*G06F 9/52* (2006.01)
*G06F 16/23* (2019.01)

(52) U.S. Cl.

CPC .......... *G06F 9/524* (2013.01); *G06F 16/2358* (2019.01)

(58) Field of Classification Search

CPC ... G06F 9/524; G06F 9/52; G06F 9/38; G06F 9/44552; G06F 16/2308; G06F 16/2315;

(Continued)

(56) References Cited

U.S. PATENT DOCUMENTS 11,436,211 B1 * 9/2022 Perianayagam ...... G06F 16/252
11,449,232 B1 * 9/2022 Kannan .................. G11C 16/10

(Continued)

FOREIGN PATENT DOCUMENTS

CN 105426222 A * 3/2016 ......... G06F 9/44552
CN 107368356 A * 11/2017 ............. G06F 9/526

(Continued)

OTHER PUBLICATIONS

International Search Report for PCT/CN2022/086091 dated Jul. 6, 2022.

(Continued)

*Primary Examiner* — April Y Blair
*Assistant Examiner* — Zhi Chen
(74) *Attorney, Agent, or Firm* — Sughrue Mion, PLLC

(57) ABSTRACT

An object processing method may include: acquiring, based on an object interaction request, a current phase change of a current change operation performed on a target object, the current change operation being divided into a plurality of phase changes according to conflict operation types corresponding to operations; determining, according to a target operation type corresponding to the object interaction request and a current relevant operation type corresponding to the current phase change, a conflict check result corresponding to the object interaction request, the target operation type being a type of a target interaction operation requested by the object interaction request; and executing, based on the conflict check result indicating no conflict, the (Continued)

target interaction operation on the target object according to the object interaction request.

17 Claims, 8 Drawing Sheets

(58) Field of Classification Search
CPC ............. G06F 16/2336; G06F 16/2343; G06F 16/2358; G06F 16/2365; G06F 16/2379; G06F 16/1767; G06F 16/1774
See application file for complete search history.

(56) References Cited

U.S. PATENT DOCUMENTS 11,599,514 B1 * 3/2023 Agrawal ............. G06F 16/2282
2008/0104600 A1 * 5/2008 May ...................... G06F 9/4881 718/103
2015/0350082 A1 * 12/2015 Pawlowski ........... G06F 3/0611 370/412

FOREIGN PATENT DOCUMENTS

| | | | |
|---|---|---|---|
| CN | 109857745 | A | 6/2019 |
| CN | 110909012 | A | 3/2020 |
| CN | 111338766 | A | 6/2020 |
| CN | 112988777 | A | 6/2021 |
| JP | 11-331157 | A | 11/1999 |

OTHER PUBLICATIONS

Written Opinion for PCT/CN2022/086091 dated Jul. 6, 2022.
European Office Action dated Jul. 1, 2024 in Application No. 22803697.6.

* cited by examiner

| | Create-public | Alter-public | Delete-delete only | Rollback-public |
|---|---|---|---|---|
| Create-public | Y | Y | N | Y |
| Alter-public | N | N | N | Y |
| Delete-delete only | N | N | N | N |
| Rollback-public | N | N | N | N |

OBJECT PROCESSING METHOD AND APPARATUS, COMPUTER DEVICE, AND STORAGE MEDIUM

CROSS-REFERENCE TO RELATED APPLICATIONS

This application is a continuation application of International Application No. PCT/CN2022/086091, filed Apr. 11, 2022, which claims priority to Chinese Patent Application No. 202110547589.7, filed with the China National Intellectual Property Administration on May 19, 2021, the disclosures of which are incorporated herein by reference in their entireties.

FIELD

The present disclosure relates to the technical field of computer networks, in particular to object processing methods, apparatuses, and associated computer devices and storage mediums.

BACKGROUND

In the art of network, interactions with objects may be recorded in databases and the like. For example, there may be a need at times to change objects in the database.

In the related art technologies, interactions with objects may be accomplished with a process called strong synchronization, which may enable a particular computing node to centrally execute interaction statements. As a result, other computing nodes need to wait for the centrally controlled computing node to finish executing before the other computing notes may proceed with subsequent processing. This sequential dependency results in inefficient object interaction processing.

The information disclosed in the above background part is used only for an understanding of the background of this application, and therefore may include information that does not constitute the related art known to a person of ordinary skill in the art.

SUMMARY

According to some embodiments, an object processing method may be performed by a computer device. The method may include: receiving an object interaction request for a target object; acquiring, based on the object interaction request, a current phase change of a current change operation performed on the target object, the current change operation including a plurality of operations, the current change operation being divided into a plurality of phase changes according to conflict operation types, which are types of conflict operations that correspond to the plurality of operations; determining, according to a target operation type corresponding to the object interaction request and a current relevant operation type corresponding to the current phase change, a conflict check result corresponding to the object interaction request, the target operation type being a type of a target interaction operation requested by the object interaction request; and executing, based on the conflict check result indicating no conflict, the target interaction operation on the target object according to the object interaction request.

According to some embodiments, an object processing apparatus may include: at least one memory configured to store program code; and at least one processor configured to read the program code and operate as instructed by the program code, the program code comprising: interaction request receiving code configured to cause the at least one processor to receive an object interaction request for a target object; phase change acquiring code configured to cause the at least one processor to acquire, based on the object interaction request, a current phase change of a current change operation performed on the target object, the current change operation comprising a plurality of operations, the current change operation being divided into a plurality of phase changes according to conflict operation types, which are types of conflict operations that correspond to the plurality of operations; conflict check code configured to cause the at least one processor to determine, according to a target operation type corresponding to the object interaction request and a current relevant operation type corresponding to the current phase change, a conflict check result corresponding to the object interaction request, the target operation type being a type of a target interaction operation requested by the object interaction request; and operation execution code configured to cause the at least one processor to execute, based on the conflict check result indicating no conflict, the target interaction operation on the target object according to the object interaction request.

According to some embodiments, an object processing apparatus, an electronic device, a non-transitory computer-readable storage medium, and a non-transitory computer program product or a computer program consistent with the object processing methods may also be provided.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Figure 1:
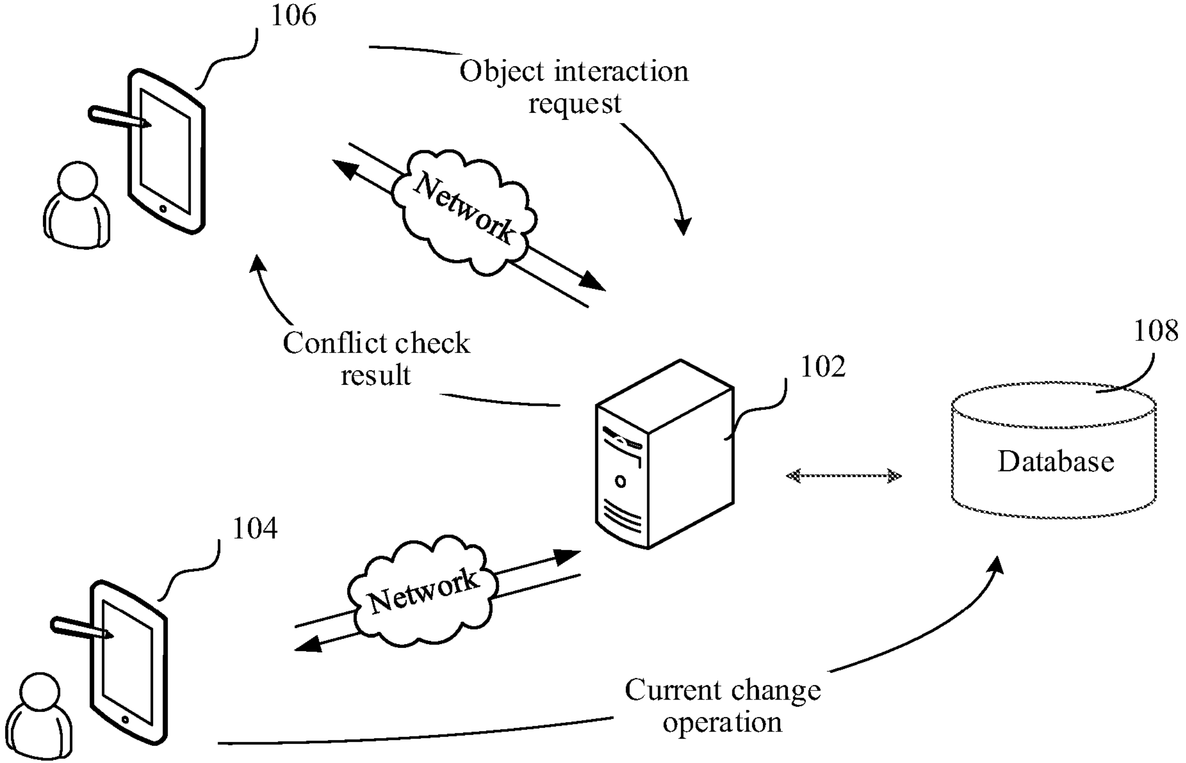
FIG. 1 is a diagram illustrating an application environment of an object processing method, according to some embodiments.

An object processing method provided in the present disclosure may be applied to an application environment shown in FIG. 1. The application environment may include a server 102, a first terminal 104, a second terminal 106, and a database 108. The first terminal 104 and the second terminal 106 communicate with the server 102 via a network, and the database 108 is a database for storing data of each terminal, and is able to perform network communication with the server and each terminal. In the application process, the first terminal 104 executes a current change operation on a target object in the database 108, the current change operation corresponding to a plurality of phase changes, and the first terminal 104 transmits an execution status of each phase change to the server when executing each phase change. When receiving an object interaction request for the target object sent by the second terminal 106, the server 102 acquires a current phase change corresponding to the current change operation of the first terminal 104 via the execution status of each phase change sent by the first terminal 104, determines a conflict check result corresponding to the object interaction request according to a target operation type corresponding to the object interaction request and a current relevant operation type corresponding to the current phase change, stops executing a target interaction operation according to the object interaction request when the conflict check result is that there is a conflict, and executes the target interaction operation on the target object according to the object interaction request and transmits the conflict check result to the second terminal 106 when the conflict check result indicates no conflict. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal (including the first terminal and the second terminal) may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in the present disclosure. In other application scenarios, the first terminal 104 and the second terminal 106 may also be implemented by one terminal device. In addition, the terminals may be replaced by servers. In some embodiments, a terminal that interacts with the target object may be implemented by an SQL engine (also referred to as a computing node or node) that primarily performs computing functions of a structured query language (SQL) layer. "A plurality of" in some embodiments of the present disclosure may be at least two.

Figure 2:
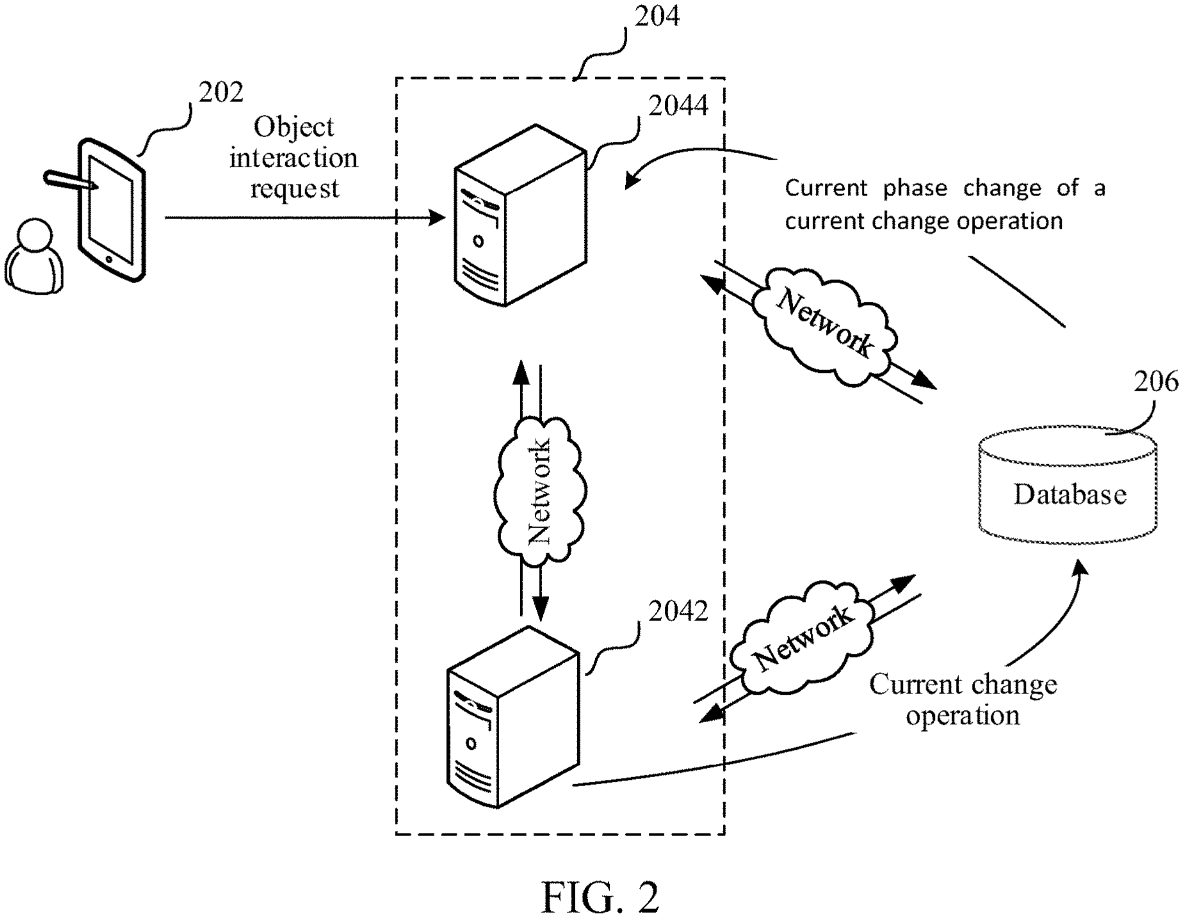
FIG. 2 is a diagram illustrating an application environment of an object processing method, according to some embodiments.

The object processing method provided by the present disclosure may also be applied to an application environment as shown in FIG. 2. The application environment may include a terminal 202, a computing node cluster 204, and a database 206. The computing node cluster 204 may include at least one computer device, which may be referred to as a computing node, and the computing nodes may be implemented via servers or interrupters. Additionally, each computing node in the computing node cluster 204 may have interaction rights to the same object. Two computing nodes, a first computing node 2042 and a second computing node 2044, are shown in FIG. 2. In practical application scenarios, fewer or more computing nodes may be included. The first computing node 2042 and the second computing node 2044 communicate with the database 206 via a network, and the database 206 is a database for storing data of each computing node. In an application process, the first computing node 2042 executes a current change operation on a target object in the database 206, the current change operation corresponding to a plurality of phase changes, and the first computing node 2042 saves an execution status of each phase change to the database 206 when executing each phase change. When receiving an object interaction request for the target object sent by the terminal 202, the second computing node 2044 acquires the execution status of each phase change under the current change operation of the first computing node 2042 from the database, determines and acquires a current phase change corresponding to the current change operation of the first computing node 2042 based on the execution statuses, determines a conflict check result corresponding to the object interaction request according to a target operation type corresponding to the object interaction request and a current relevant operation type corresponding to the current phase change, the target operation type being a type of a target interaction operation requested by the object interaction request, stops executing the target interaction operation according to the object interaction request when the conflict check result is that there is a conflict, and executes the target interaction operation on the target object according to the object interaction request when the conflict check result indicates no conflict.

Some embodiments provided by the present disclosure may be implemented based on cloud technology. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which may only be implemented through cloud computing.

Storage resources required by the background service may be implemented through a database. The database may be regarded as an electronic filing cabinet for storing electronic files, and users may perform add, query, update and delete data in the files. The database is a collection of data that is stored together in a manner that may be shared with a plurality of users, has as little redundancy as possible, and is independent of applications. A database management system (DBMS) is a computer software system designed to manage databases, and generally has the basic functions of storage, interception, security, backup and so on. The database management system may be classified according to a database model it supports, such as relational expression, XML (Extensible Markup Language); or according to the type of computers supported, such as server clusters and mobile phones; or according to a query language used, such as SQL and XQuery; or according to performance impulse priorities, e.g. maximum scale and maximum running speed; or according to other classification methods. Regardless of which classification method is used, some DBMS may cross categories, e.g. support a plurality of query languages simultaneously.

As for an object processing method and apparatus, a computer device, and a storage medium provided by the present disclosure, data generated during operation of some embodiments may be stored on a block chain. For example, a current phase change of a current change operation on a target object is recorded in the block chain; when receiving an object interaction request, a terminal or a server acquires the current phase change from the block chain, determines a current relevant operation type corresponding to the current phase change, determines a conflict check result corresponding to the object interaction request according to a target operation type and the current relevant operation type, stops executing a target interaction operation according to the object interaction request when determining that there is a conflict, and continues to execute the target interaction operation according to the object interaction request and records status information of each phase in the interaction operation process into the block chain when determining that there is no conflict. In addition, the conflict check result may also be recorded into the block chain. The terminal or server may obtain the status information of each phase in the interaction operation process from the block chain. At the same time, the target operation type, the current relevant operation type and the conflict check result generated in the running process may all be recorded in the block chain. By recording the data in the block chain, the data may be prevented from being tampered with, the storage reliability of the data is ensured, and thus the reliability of the object processing process is ensured.

Figures 3, 4:
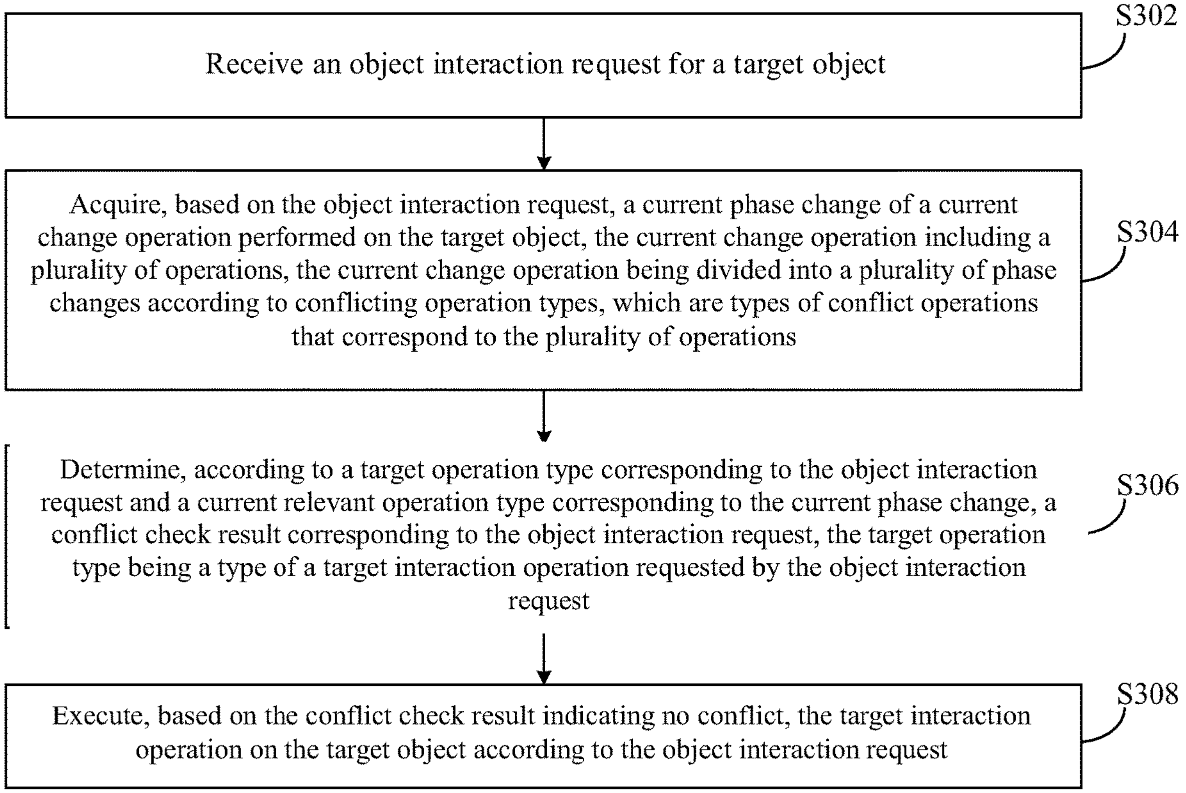
FIG. 3 is a schematic flowchart of an object processing method, according to some embodiments.
FIG. 4 is a schematic diagram of a status transition matrix, according to some embodiments.

In some embodiments, as shown in FIG. 3, an object processing method is provided. The method is applied to a computer device which may be either a server or a terminal. The embodiment is illustrated with the method applied to a server. The method may also be applied to a system including a terminal and a server, and is implemented through interactions between the terminal and the server. In the embodiment, the method may include the following operations:

S302: Receive an object interaction request for a target object.

An object is a subject for which a network interaction is directed, and may be at least one of a network device, data in the network device, or data in a database, etc. In some embodiments, the target object may be at least one of data stored in a database or metadata, etc. The target object may specifically be Schema (an abstract set of metadata) in a database, such as at least one of the following in the database: tables, columns, indices, constraints, stored procedures or functions, etc. Further, the number of the target object may be at least one. When there are at least two target objects, the conflict check may be respectively performed for each target object, and then target interaction operations performed on each target object according to an object interaction request may be stopped in a targeted manner or continued.

The interaction may be at least one of change or query, etc. for the target object. The change may be at least one of create, alter, delete, insert or update, etc. Specifically, inserting one column into a table may be considered as one change operation, and inserting two columns may be considered as two change operations.

In some embodiments, the object interaction request is a request for a particular interaction with the target object. Further, each object interaction request may correspond to at least one object interaction operation, and after the object interaction request is determined, corresponding object interaction operations may be determined to obtain the target interaction operation. An object interaction request may correspond to at least one target interaction operation. For example, for the following object interaction request: "alter table t, add a int, add b int," corresponding target interaction operations cause the addition of two columns (i.e., a and b) to a table t. Each operation of adding a column may be considered as a target interaction operation. When the interaction is a change operation, the server may determine a target change operation corresponding to an object interaction request if receiving the object interaction request.

Taking the target object as Schema in the database as an example, the object interaction operation may be at least one of data manipulation language (DML), data definition language (DDL), or data control language (DCL), etc. DML may be commands of select, update, insert and delete, and the four commands are languages for manipulating data in a database. DDL has more command types than DML, and the main commands are created, altered or dropped, etc. DDL is mainly used for defining or changing the structure of tables, data types, links and constraints between tables, and other initialization work, and is mostly used when creating tables. DCL is a database control function, and is a statement used for setting or changing the permission of a database user or role, including grant, deny, or revoke, etc. Further, languages such as DML, DDL, or DCL are operations to change an object in a database, and thus may be referred to as object change operations, and a corresponding request may be referred to as an object change requests. In addition, an object interaction operation may be further subdivided. For example, alter may also be subdivided into operations such as copy, inplace, or online, which may also be divided into a plurality of phase changes based on operations. Further, the object interaction request may be a command statement received by the server from the terminal, for example, a DDL statement received by the server from the terminal is an object interaction request.

In some embodiments, the server may receive the object interaction request for the target object from the terminal.

S304: Acquire, based on the object interaction request, a current phase change of a current change operation performed on the target object. The current change operation may include a plurality of operations. The current change operation may be divided into a plurality of phase changes according to conflict operation types corresponding to the operations, and the conflict operation types may be types of conflict operations corresponding to the operations.

The change operation is an operation of changing the target object, and may be an operation of changing the content, structure, etc. of the target object, and may specifically be at least one of create, alter, delete, insert, or update, etc. The current change operation may be a change operation that a particular computing node is performing on the target object when the object interaction request is received, or a change operation performed by the particular computing node on the target object a set period of time before or after the object interaction request is received. The change operation may include a plurality of phase changes. The phase changes are execution phases subdivided for execution of a change operation. Each phase change may include at least one operation, and operations in the same phase change correspond to the same conflict operation type, that is, if a computing node C transmits an object interaction request during the execution of the same phase change, a response made by the server is unique. For example, the computing node C is triggered to be rolled back or continue to be executed. In some embodiments, an execution priority of the current change operation may be higher than or equal to that of a target operation corresponding to the object interaction request, and further, an execution priority of each phase change of the current change operation may also be higher than or equal to that of each interaction phase corresponding to the object interaction request. Further, the current phase change may be a phase change that the particular computing node is performing on the target object when the object interaction request is received, or may be a phase change performed by the particular computing node on the target object a period of time before or after the object interaction request is received.

An operation may include a plurality of operations, namely, an operation is divided into a plurality of operations for execution. Functions to be achieved by the operation may be completed by executing the plurality of operations corresponding to the operation. The operations are operation units corresponding to the operation. For example, an operation may include at least one operation of handshake connection establishment, interface access, meta-information acquisition, meta-information check, status identifier update, data record read, data record comparison, or data record alter, etc. The operations are executed according to a certain time sequence to complete a corresponding change operation. Further, the conflict operations corresponding to the operations are interaction operations conflicting with the operations, that is, if an operation runs in parallel with a conflict operation, information corresponding to the target object may be disordered. Therefore, the server needs to prevent the operations from running in parallel with the corresponding conflict operations. Further, the conflict operation types are the types of the conflict operations corresponding to the operations. The conflict operations may include a plurality of types and may be at least one of create, alter, delete, insert, update, or query, etc.

In some embodiments, the current change operation performed on the target object may be a change operation performed by a target computing node on the target object. The target computing node may be another computer device that is different from the aforementioned server.

In some embodiments, a process of performing phase change division on the current change operation may be: 1. The server performs division automatically in a certain manner, that is, the server automatically divides the current change operation into a plurality of phase changes according to the conflict operation types. 2. Manual division may be performed in advance.

Further, in the case where the server automatically divides the change operation into phase changes, the server may determine whether each operation may run in parallel with other computing nodes in a computing node cluster, and if not, the server determines that there is a conflict, and determines an operation type corresponding to a computing node which may generate a conflict as a conflict operation type of a corresponding operation. Furthermore, successive operations of the same conflict operation type may be in the same phase change, and operations of different conflict operation types may also be divided into different phase changes. The computing node cluster is a cluster of computing nodes that may interact with the target object. Further, the target object is an object in a target database, and the target database is a database corresponding to the server. Terminals and servers which may access the database are determined as computing nodes, and the computing nodes constitute the computing node cluster.

In some embodiments, the server may set a status record table that may be represented as ddl_job or ddl_jobs. The status record table records an execution status of each phase change in each change operation performed on the target object. An initial status corresponding to each phase change may not be executed, and a computing node may alter the status from not executed to executed each time a phase change is executed. When receiving the object interaction request, the server may access the status record table to locate a target status record corresponding to the current change operation, and determine a first phase change not executed in the target status record as the current phase change in the order of phase changes. Further, when a phase change of the current change operation fails to be executed, a status record of a latest executed phase change may be obtained from the status record table, and then a phase change before the execution failure may be recovered based on the status record. In this case, the phase change which fails to be executed may be performed again. The status record table may be stored in the server, or in the computing node performing the current change operation, or in a database accessible to both the server and each computing node.

S306: Determine, according to a target operation type corresponding to the object interaction request and a current relevant operation type corresponding to the current phase change, a conflict check result corresponding to the object interaction request. The target operation type may be a type of the target interaction operation requested by the object interaction request.

In some embodiments, the current relevant operation type may include a current conflict operation type or a current parallel operation type.

In some embodiments, the target operation type is the type of the target interaction operation, and may be at least one of create, alter, delete, insert, update, or query, etc. The target operation type corresponding to the object interaction request may be at least one. When there are at least two target operation types, each target operation type may be respectively compared with the current relevant operation type corresponding to the current phase change so as to obtain the conflict check result.

In some embodiments, the current conflict operation type is an operation type that is not allowed to be executed in synchronization with the current phase change, the current parallel operation type is an operation type that is allowed to be executed in synchronization with the current phase change, the current conflict operation type may include at least one conflict operation type, and the current parallel operation type may also include at least one parallel operation type. Further, a matching determining may be performed on the target operation type and the current relevant operation type, and the conflict check result corresponding to the object interaction request is obtained according to a matching determining result. Specifically, if the current conflict operation type may include the target operation type, the conflict check result is that there is a conflict, and if the current parallel operation type may include the target operation type, the conflict check indicates no conflict. In some embodiments, the current conflict operation type and the current parallel operation type may also be determined together as the current relevant operation type.

In some embodiments, the current conflict operation type and the current parallel operation type may be determined based on predetermined operation type record tables corresponding to each change operation. Further, the operation type record table may include a conflict operation type record table and a parallel operation type record table. Furthermore, when determining the current change operation, the server determines a conflict operation type record table corresponding to the current change operation, and determines a conflict operation type recorded in the conflict operation type record table as the current conflict operation type. Also, the current parallel operation type may be determined according to the predetermined parallel operation type record table for each change operation. When determining the current change operation, the server determines the parallel operation type record table corresponding to the current change operation, and determines a parallel operation type recorded in the parallel operation type record table as the current parallel operation type.

S308: Execute, based on the conflict check result indicating no conflict, the target interaction operation on the target object according to the object interaction request.

Specifically, when the object interaction request is the object change request, the corresponding target change operation is performed on the target object. For example, when a DDL statement is received, a command corresponding to the DDL statement is performed on the target object.

When there is no conflict, the target operation type corresponding to the object interaction request and the current relevant operation type corresponding to the current phase change are allowed to run in parallel, and the target interaction operation may be executed according to the object interaction request.

In some embodiments, when the conflict check result is that there is a conflict, executing the target interaction operation according to the object interaction request is stopped. When there is a conflict, the target operation type corresponding to the object interaction request and the current relevant operation type corresponding to the current phase change are not allowed to run in parallel, and executing the target interaction operation according to the object interaction request may be stopped.

In the above object processing method, by subdividing a change operation into phase changes, a conflict check may be performed in each phase change, operation phases without conflicts may run in parallel, and at the same time, operation phases with conflicts may be stopped, such that the atomicity of the operation may be ensured, the influence of the change operation on other interaction operations may be greatly reduced, and the efficiency of object interaction processing may be effectively improved. In addition, by subdividing the current change operation into phase changes, the comparison between the target interaction operation and the current change operation is refined, and the target interaction operation does not need to wait until all the phases of the change operation are completely executed. This method does not affect the production environment, may minimize the influence of the change operation on other interaction operations, and is imperceptible to a user who triggers the object interaction request.

In some embodiments, obtaining the current phase change of the current change operation performed on the target object may include: acquire a current operation corresponding to the current change operation performed on the target object; and determine a phase change corresponding to the current operation as the current phase change of the current change operation performed on the target object, successive operations of different conflict operation types being divided into different phase changes.

The current operation may be an operation that a particular computing node is performing on the target object when the object interaction request is received, and may also be an operation performed by the particular computing node on the target object a set period of time before or after the object interaction request is received.

In some embodiments, a correspondence between the operations and the phase changes may be preset, or the phase changes corresponding to the operations may be determined on-the-fly. When receiving the object interaction request, the server determines the current phase change corresponding to the current operation according to the correspondence between the operations and the phase changes.

In the above embodiment, the current phase change is determined based on the current operation corresponding to the current change operation, and then a conflict check is performed on the object interaction request based on the current phase change. The current phase change may be determined accurately through detailed operations, so as to obtain the reliable conflict check result.

In some embodiments, the operation of performing phase division on the current change operation may include: determine a current operation sequence corresponding to the current change operation, the current operation sequence including a plurality of operations arranged according to an operation order; determine conflict operation types corresponding to the operations in the current operation sequence; and divide the current operation sequence according to the conflict operation types corresponding to the operations to obtain a plurality of phase changes corresponding to the current change operation, successive operations of the same conflict operation type being in the same phase change.

An operation sequence is a sequence obtained by sorting a plurality of operations according to an execution order. At least two operations that are adjacent in the execution order may be considered as successive operations. That is, adjacent operations are divided into different phase changes if corresponding conflict operation types are different.

In some embodiments, the change operation may include a plurality of operations. Taking a create operation as an example, the create operation may include the following successive operations: 1: Acquire meta-information. 2: Check the meta-information. 3: Add new table data to a data dictionary, the data dictionary being storable in the database. 4: Update a status identifier. The operations constitute the current operation sequence. Interactions of the operations with other computing nodes during execution may have different conflict statuses. For example, assuming that another operation is an insert operation, operations of the insert operation may run in parallel with the operations of acquiring the meta-information, checking the meta-information and updating the status identifier in the create operation, that is, there is no conflict; and the operations of the insert operation may not run in parallel with the operation of adding the new table data to the data dictionary in the create operation, and operation rollbacks need to be inserted, that is, there is a conflict. Further, conflict operation types corresponding to mutually successive operations 1 and 2 are the same, and therefore the two operations may be in the same phase change as a meta-information check phase; conflict operation types corresponding to operations 2 and 3 are different, and therefore the two operations may be divided into different phase changes; and at the same time, conflict operation types corresponding to operations 3 and 4 are different, and therefore the two operations may be divided into different phase changes, and the operations 3 and 4 are divided into a data adding phase and an identifier updating phase, respectively. In this way, the operation sequence corresponding to the create operation is divided into the meta-information check phase, the data adding phase and the identifier updating phase. In the process of actually dividing the change operation, more operations may be compared, or all interaction operations on the same object in the computing node cluster may be included.

In the above embodiment, the division of the phase changes of the change operation is performed according to the conflict operation types corresponding to each operation in the operation sequence, successive operations of the same conflict operation type are in the same phase change, and successive operations of different conflict operation types are divided into different phase changes, such that the division of the phase changes may be accurately realized based on the conflict operation types corresponding to the operations.

In some embodiments, determining, according to the target operation type corresponding to the object interaction request and the current relevant operation type corresponding to the current phase change, the conflict check result corresponding to the object interaction request may include: extract an operation type identifier from the object interaction request, and obtain, according to the extracted operation type identifier, the target operation type corresponding to the object interaction request; and compare the target operation type with the current conflict operation type, and determine, based on determining that the current conflict operation type may include the target operation type according to a comparison result, that the conflict check result is that there is a conflict.

The computing node may carry a type identifier of the target operation type when transmitting the object interaction request. The server may obtain the target operation type by extracting the type identifier from information carried by the object interaction request.

In some embodiments, if there are a plurality of current conflict operation types, the target operation type may be compared with the current conflict operation types one by one. When there is a conflict operation type consistent with the target operation type, the current conflict operation types include the target operation type. In this case, the conflict check result is that there is a conflict. When there is no conflict operation type consistent with the target operation type, the current conflict operation types do not include the target operation type. In this case, the conflict check result is that there is no conflict.

In the above embodiment, the conflict check is performed based on the comparison result between the target operation type and the current conflict operation type, such that the conflict check result may be quickly obtained, and the efficiency of object processing may be effectively improved.

In some embodiments, determining, according to the target operation type corresponding to the object interaction request and the current relevant operation type corresponding to the current phase change, the conflict check result corresponding to the object interaction request may include: extract the operation type identifier from the object interaction request, and obtain, according to the extracted operation type identifier, the target operation type corresponding to the object interaction request; and compare the target operation type with the current parallel operation type, and determine, based on determining that the current parallel operation type does not include the target operation type according to the comparison result, that the conflict check result is that there is a conflict.

In some embodiments, if there are a plurality of current parallel operation types, the target operation type may be compared with the current parallel operation types one by one. When there is no conflict operation type consistent with the target operation type, the current parallel operation types do not include the target operation type. In this case, the conflict check result is that there is a conflict. Similarly, when there is a conflict operation type consistent with the target operation type, the current parallel operation types include the target operation type. In this case, the conflict check result is that there is no conflict.

In the above embodiment, the conflict check is performed based on the comparison result between the target operation type and the current parallel operation type, such that the conflict check result may be quickly obtained, and the efficiency of object processing may be effectively improved.

In some embodiments, the operation type record table may be implemented through a status transition matrix which may record the possibility of transition between statuses of the target object. If the transition may be made, the transition is allowed; and if the transition may not be made, the transition is not allowed. Further, the conflict check result corresponding to the object interaction request may be determined according to the status transition matrix. The statuses of the target object may be data read/write statuses of the target object, and may be at least one status of public, read, write, no write, no read, waiting, or delete only, etc. Public refers to a status in which read, write, and delete operations may be performed.

In some embodiments, each operation type may correspond to different statuses of the target object. In some embodiments, a target status of the target object may be determined based on the target operation type, and a current status of the target object may be determined based on the operation type of the current change operation. Specifically, the current status may be a status before the current change operation is executed if the current change operation is not completed, or a status after the current change operation is executed if the current change operation has been executed. In addition, an expected status of the target operation type for the target object may be determined as the target status of the target object.

In some embodiments, each phase change may also have a corresponding state, and the current status of the target object may also be determined according to an execution status of the current phase change. For details, see the above process for determining the current status according to the current change operation, which will not be repeated here.

In some embodiments, the target status corresponding to the target object after interaction with the target object is performed according to the target operation type is determined, and when transition of the target object from the current status to the target status is allowed based on the status transition matrix, the conflict check result is that there is no conflict. Otherwise, the conflict check result corresponding to the object change request is that there is a conflict.

In some embodiments, the status transition matrix may be as shown in FIG. 4. FIG. 4 records whether transition from statuses of column items to statuses of row items is allowed, where an arrow in the table indicates a direction of transition, Y indicates allowed, and N indicates not allowed. Taking transition from a first status of a first column to a second status of a first row as an example, the current status of the target object is create-public, that is, the current change operation is the create operation, and a corresponding status of the create operation is public when the create operation is completed; and the target status of the target object is alter-public, that is, the target interaction operation is an alter operation, and a corresponding status of the alter operation is public when the alter operation is completed. The transition is allowed by querying information of the status transition matrix in FIG. 4. Therefore, the conflict check result is that there is no conflict.

In some embodiments, the method further may include the following operations: Stop, based on the conflict check result is that there is a conflict, executing the target interaction operation on the target object according to the object interaction request.

When there is a conflict, the target operation type corresponding to the object interaction request and the current relevant operation type corresponding to the current phase change are not allowed to run in parallel, and executing the target interaction operation according to the object interaction request may be stopped.

In some embodiments, when there is a conflict, a rollback operation may also be executed to recover a status before the object interaction request is received. Then the execution status of the current change operation may be monitored in real time. If the current change operation is completed, the latest status after the target object is changed through the current change operation is acquired. A response may be given to the object interaction request again, and then the target interaction operation is executed based on the latest status of the target object.

In this way, the interaction process may be performed based on the latest status of the target object, which may prevent different computing nodes from acquiring differences in the status of the target object.

In some embodiments, executing, in case that the conflict check result is that there is no conflict, the target interaction operation on the target object according to the object interaction request may include: determine, based on the conflict check result is that there is no conflict, a target operation sequence corresponding to the target operation type based on the object interaction request; and execute the target interaction operation on the target object according to the target operation sequence.

In some embodiments, operation sequences corresponding to the operations may be recorded through an operation sequence record table. When the object interaction request is received and the conflict check result is that there is no conflict, an operation sequence corresponding to the operation type identifier is determined from the operation sequence record table based on the operation type identifier of the target operation type, so as to obtain the target operation sequence.

In the above embodiment, the target operation sequence corresponding to the target operation type is determined, and then the target interaction operation is performed on the target object according to the target operation sequence, such that the target interaction operation corresponding to the object interaction request may be performed on the target object, and a reliable response to the object interaction request is ensured.

In some embodiments, executing the target interaction operation on the target object according to the target operation sequence may include: determine a first operation phase corresponding to the target object, the first operation phase being a next operation phase corresponding to the object interaction request; transmit, based on a phase priority corresponding to the first operation phase meets a priority execution condition, an operation locking request for the target object; and execute, based on determining that locking response information for the operation locking request is received, an operation corresponding to the first operation phase.

The operation locking request is a request for triggering operation locking. Further, the operation locking request is sent to computing nodes that are interacting with the target object to trigger the computing nodes to be added with corresponding object locks, so as to be locked in a current operation performed on the target object until unlocked. The locking response information may be response information returned by the computing nodes to the server after being added with the object locks, that is, feedback that a lock application succeeds. When receiving the locking response information, the server may determine that the corresponding computing nodes have been added with the corresponding object locks.

In some embodiments, the process of determining whether the phase priority corresponding to the first operation phase meets the priority execution condition may be as follows: acquire each phase priority in each interaction operation for interaction with the target object, compare the phase priority corresponding to the first operation phase with the phase priorities, and determine, when the phase priority corresponding to the first operation phase is the highest, that the phase priority corresponding to the first operation phase meets the priority execution condition.

In some embodiments, the process of transmitting the operation locking request for the target object may be as follows: transmit the operation locking request for the target object to other computing nodes in the computing node cluster, so as to enable the computing nodes to return the locking response information to the server. Further, the operation locking request may be transmitted to all the computing nodes in the computing node cluster, which may be considered as a request for a global lock. In some cases, the operation locking request may also be transmitted to some computing nodes in the computing node cluster, which may be considered as a request for a local lock. In some embodiments, after the operation locking request for the target object is transmitted to other computing nodes in the computing node cluster, the operation corresponding to the first operation phase may be executed when the locking response information is received from some computing nodes; or the operation corresponding to the first operation phase may be executed when the locking response information is received from all the computing nodes.

Further, executing the target interaction operation on the target object according to the target operation sequence may include: determine a next operation phase corresponding to the target object to obtain the first operation phase; transmit the operation locking request to the computing node cluster, such that each computing node in the computing node cluster is added with an object lock and returns the locking response information when compatible with the operation locking request; execute, based on the locking response information returned by each computing node in the computing node cluster is received, the first operation phase; transmit, when the first operation phase is completed, an operation unlocking request to the computing node cluster, such that each computing node in the computing node cluster releases the object lock and continues to run; and return to an operation of acquiring a next phase change for changing the target object according to the object change request until each operation phase change corresponding to the object change request is executed.

In some embodiments, the target interaction operation is divided into a plurality of small operation phases, and locks may not be applied for all the operation phases. The locks may be applied again at the beginning of an operation phase needing to be controlled, and the locks may be released after the completion of each operation phase. Specifically, data in table A are stored in a data table, table A is being deleted based on an object change operation, and when table A has been deleted and the data in table A are being deleted from the data table, if a change operation of creating a table with the same name is received, since table A has been deleted, the new table has no conflict with either the deleted table or the operation of deleting the data table, such that the process of creating the new table does not need to apply for a lock.

In some embodiments, taking the target interaction operation being an DDL statement as an example, the whole computing node cluster may be displayed as a whole, and the server needs to apply for a global lock before other DML statements may be rolled back due to the next phase of DDL. In this case, strong synchronization may be performed. The specific process of applying for the global lock may be as follows:

1. The server first transmits a lock application request to all the nodes of the computing node cluster, and waits for a period of time.

2. The server checks whether other computing nodes transmit a feedback of holding incompatible locks, and if yes, waits and enters 3. If there is no feedback of holding the lock or no locking response information is received, the server may push to the next phase, and enter 4.

3. The server waits for the locking response information of each computing node.

4. The server pushes a status of the target object. Due to status push, other computing nodes may be rolled back accordingly if transmitting no feedback in the previous phase.

5. After execution completion, the server transmits a lock release message to computing nodes that transmit the feedback, and continues to perform the above operations repeatedly until the DDL statement is completed.

In the above embodiment, the server requests operation locking in each operation phase, such that each operation phase may serve as an independent operation unit, a conflict check of the minimum unit may be realized, and the process of waiting for the computing nodes is shortened as much as possible.

In some embodiments, the object processing method further may include the following operations: determine a second operation phase corresponding to the target object, the second operation phase being a next operation phase corresponding to the first operation phase; and maintain, based on a phase priority corresponding to the second operation phase meets the priority execution condition, the object lock requested by the operation locking request, and execute an operation corresponding to the second operation phase.

In the above embodiment, after a lock is applied for in the first operation phase, if the second operation phase also needs to apply for a lock, the lock applied in the first operation phase is not released, so as to prevent the lock application operation from being repeated, and the efficiency of object processing may be effectively improved.

In some embodiments, transmitting, based on the phase priority corresponding to the first operation phase meets the priority execution condition, the operation locking request for the target object may include: determine an operation content level of operation content corresponding to the first operation phase; and determine, based on the operation content level is an object level, that the phase priority corresponding to the first operation phase meets the priority execution condition, and transmit the operation locking request for the target object.

The operation content is content operated by the interaction operations on the target object, and the operation content may be content of the object level or content of a data level. Taking the target object being a table as an example, the operation content may be the content of the object level, such as operations performed on the structure of the table, data type, links and constraints between tables, and the operation content may be the content of the data level, such as inserting a record into the table and altering data of a record in the table. An interaction operation of the content level has a greater degree of influence on the target object than an interaction operation of the data level.

In the above embodiment, the phase priorities corresponding to the operation phases are determined based on the operation content level, so as to determine whether to transmit the operation locking request. The interaction operation of the content level may be executed preferentially while the interaction operation of the data level is executed later, thereby effectively avoiding a situation that after the interaction operation of the data level is executed, the interaction operation of the content level covers the interaction operation of the data level, and an invalid operation occurs. In this way, the efficiency of object processing may be effectively improved.

In some embodiments, the phase priority corresponding to the first operation phase may also be determined according to the target operation type, and when the target operation type meets a preset type condition, the phase priorities corresponding to the operation phases of the target interaction operation are determined as all meeting the priority execution condition. Further, when the operation content level of the target interaction operation is the object level, the target operation type is determined as meeting the preset type condition, and the phase priorities corresponding to the operation phases of the target interaction operation are determined as all meeting the priority execution condition. Specifically, when the target operation type is an operation type corresponding to the DDL statement, the phase priorities corresponding to the operation phases of the target interaction operation are determined as all meeting the priority execution condition, that is, an execution priority of the DDL statement is higher than those of a DML statement, etc.

In some embodiments, the object processing method further may include the following operations: determine a target object version identifier corresponding to the object interaction request; acquire a current object version identifier corresponding to the target object after the target object is changed according to the current change operation; and compare the target object version identifier with the current object version identifier, and stop, based on determining that the target object version identifier and the current object version identifier are inconsistent through comparison, a response to the object interaction request.

The object interaction request carries a version identifier of the target object, and after receiving the object interaction request, the server determines the version identifier of the target object carried by the request to obtain the target object version identifier.

The target object has the version identifier correspondingly, and after the target object is updated, the version identifier of the target object may change. For example, each time the target object is changed, the version identifier of the target object is +1, and thus the current object version identifier corresponding to the target object may be obtained.

In the above embodiment, whether to respond to the object interaction request is determined by comparing the version identifiers of the target object, and a response is given to the object interaction request only when the target object version identifier is consistent with the current object version identifier. Thus, the interaction operations on the target object are all performed with the latest status of the target object, content of the target object acquired by different computing nodes is prevented from being different, and the data consistency of all the computing nodes in the computing node cluster for the target object may be ensured.

In some embodiments, the object interaction request is the object change request, and executing the target interaction operation according to the object interaction request may include: acquire, when the next object phase change is an information check phase, basic interaction information corresponding to the object interaction request; check the basic interaction information; and change, when the basic interaction information passes the check, a status of the target object.

In some embodiments, the object interaction request is the object change request, and executing the target interaction operation according to the object interaction request may include: perform, based on the next object phase change is a version identifier write phase, a corresponding running status change operation on the target object; acquire a target status version identifier corresponding to the target object after the running status change operation is performed; and write the target status version identifier into a storage space, so that a storage node in the storage space, when receiving a new object interaction request for the target object, determines a status version identifier carried by the new object interaction request, and stops responding to the new object interaction request when the status version identifier carried by the object interaction request does not match the target status version identifier. The storage node, which may also be referred to as TD Store, may be a computer device capable of running in a storage layer, primarily performing transactions and storage functions.

In some embodiments, the object interaction request is the object change request, and executing the target interaction operation according to the object interaction request may include: perform, when the next object phase change is a status broadcast phase, a corresponding running status change operation on the target object; and generate phase change broadcast information based on the status change operation. The status change broadcast information is used for triggering each computing node in the computing node cluster to acquire the target object after the status change operation. The status change broadcast information is broadcast information generated when the status of the target object is changed. Each computing node, upon receiving the status change broadcast information, may acquire the latest status and latest version information corresponding to the target object from the status record table. Further, the status change broadcast information may be represented by a global schema version (GLSV) or the like.

In the above embodiment, the object change request is responded to through different phase changes, and an execution order of the phase changes may be adjusted according to the actual situation. In addition, the number and order of phase changes may be different for different target operation types. In this way, the response to the object change request may be made through a plurality of independent phase changes, ensuring atomic control over the change operations.

In some embodiments, determining, according to the target operation type corresponding to the object interaction request and the current relevant operation type corresponding to the current phase change, the conflict check result corresponding to the object interaction request may include: acquire the status record table from the storage space, the status record table being used for recording status information corresponding to each object change operation; and determine, according to the target operation type corresponding to the object interaction request and the current relevant operation type corresponding to the current phase change, the conflict check result corresponding to the object interaction request when there is no status information of a conflict object change operation in the status record table, the conflict object change operation being a change operation that conflicts with the object interaction request. The conflict check performed in the embodiment may be considered as the conflict check between interaction operations, and may be considered as a first-level conflict check.

In some embodiments, the object interaction request is the object change request, and determining, according to the target operation type corresponding to the object interaction request and the current relevant operation type corresponding to the current phase change, the conflict check result corresponding to the object interaction request when there is no status information of the conflict object change operation in the status record table may include: acquire an object identifier of the target object; transmit an object registration request to a management of cluster node based on the object identifier, such that the management of cluster node generates a unique registration number based on the object identifier based on the object registration request; and determine, according to the target operation type corresponding to the object interaction request and the current relevant operation type corresponding to the current phase change, the conflict check result corresponding to the object interaction request when the unique registration number sent by the management of cluster node is acquired. The conflict check performed in the embodiment may be considered as the conflict check within the interaction operations, and may be considered as a second-level conflict check.

In some embodiments, each phase change of the current change operation may have a corresponding operation type that may be determined based on a pre-configured status of the target object. For example, for an operation phase in a delete-only state, an operation type may be a delete operation type; for an operation phase in a write state, an operation type may be a write operation type; and for an operation phase in a read state, an operation type may be a read operation type.

In some embodiments, determining, according to the target operation type corresponding to the object interaction request and the current relevant operation type corresponding to the current phase change, the conflict check result corresponding to the object interaction request may include: determine, based on the current phase change is an operation blocking information write phase, that the current parallel operation type corresponding to the current phase change is the delete operation type, the operation blocking information write phase being used for writing the current object version identifier corresponding to the target object after the target object is changed according to the current change operation; and determine, based on the target operation type does not match the delete operation type, that the conflict check result corresponding to the object interaction request is that there is a conflict.

The operation blocking information write phase is a phase of writing operation blocking information into the storage space, which may also be referred to as a write fence phase. The operation blocking information may be information for blocking an unqualified operation. The unqualified operation may be an operation whose version identifier is inconsistent with the current object version identifier corresponding to the target object.

The delete operation type is an operation type capable of being deleted. Specifically, the delete operation type may be the operation type in the delete-only status. Further, the conflict check result is that there is no conflict only when the target operation type corresponds to the delete operation. Otherwise, the conflict check result is that there is a conflict.

In some embodiments, Schema may be accompanied by a version number, and after an interaction operation is completed, the version number of Schema may be stored as data to a storage node. The version number may be +1 in the write fence phase.

In some embodiments, if DDL statements for certain Schema are completed, other nodes may know that the DDL statements for Schema have been completed based on a broadcast global object version, and thus may acquire the latest version number and the latest status of Schema through ddl_job. When a DML statement accesses Schema with a version number, if the version number is smaller than a current version number of Schema, Schema is in the process of executing the DDL statements and has not completed the process, and the DML statement needs to be rolled back. In this way, other statements may be effectively prevented from interacting with Schema during the execution of the DDL statements.

In the above embodiment, the conflict check result is determined based on matching determining on the operation types in the operation blocking information write phase, and the reliability of the conflict check result may be effectively ensured.

Figure 5:
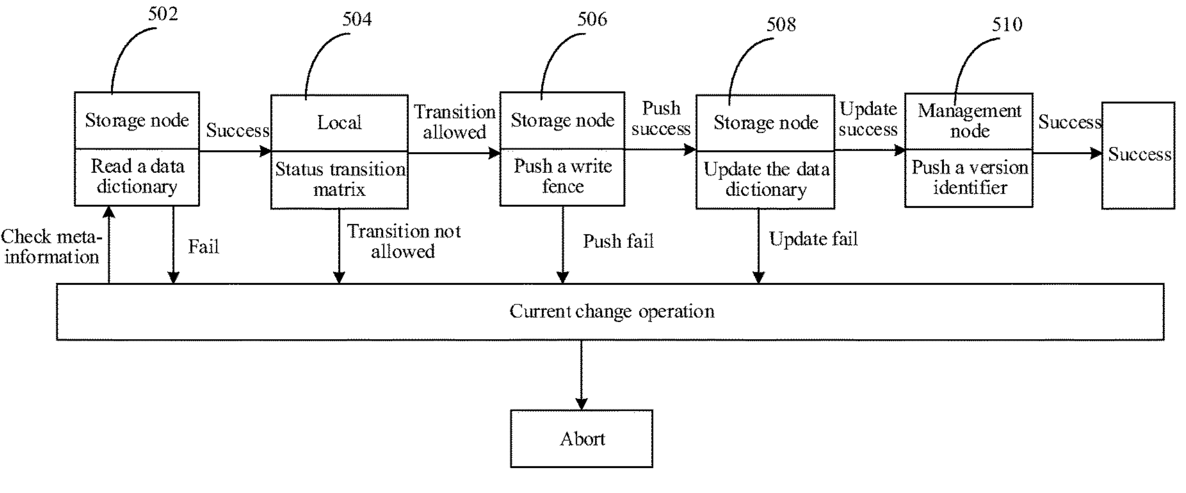
FIG. 5 is a schematic flowchart of a change operation, according to some embodiments.

In some embodiments, phase changes corresponding to the current change operation may be as shown in 502, 504, 506, 508, and 510 in FIG. 5. Each phase change in FIG. 5 may have a status correspondingly. After receiving the object interaction request, the server performs matching determining on the target operation type corresponding to the object interaction request and the current parallel operation type of the current phase change, determines the conflict check result as that there is no conflict if the two match, and determines the conflict check result as that there is a conflict if the two do not match. A management node, which may also be referred to as the management of cluster (MC) node, may be implemented by a computer device to manage information necessary for the entire cluster.

Further, the detailed description of the phase change corresponding to the current change operation is as follows:

1. When receiving the DDL statement, the server reads the data dictionary from the storage node to obtain the meta-information, and checks the meta-information. If the meta-information does not pass the check, the response to the object interaction request is aborted.
2. If the meta-information passes the check, the server determines a current status and a target status of Schema, acquires the status transition matrix from a local storage space, and determines whether to allow transition from the current status to the target status based on the status transition matrix. If the transition is not allowed, x the response to the object interaction request is aborted.
3. If the translation is allowed, a write fence is pushed to the storage node, so as to store the version number of Schema as data to the storage node. If the push fails, the response to the object interaction request is aborted.
4. If the push succeeds, the data dictionary is updated through the storage node. If the update fails, the response to the object interaction request is aborted.
5. If the update succeeds, GLSV is pushed to the management node to inform the other computing nodes of an execution status of the statement for Schema.
6. If the GLSV push succeeds, the current change operation is determined as success.

Figure 6:
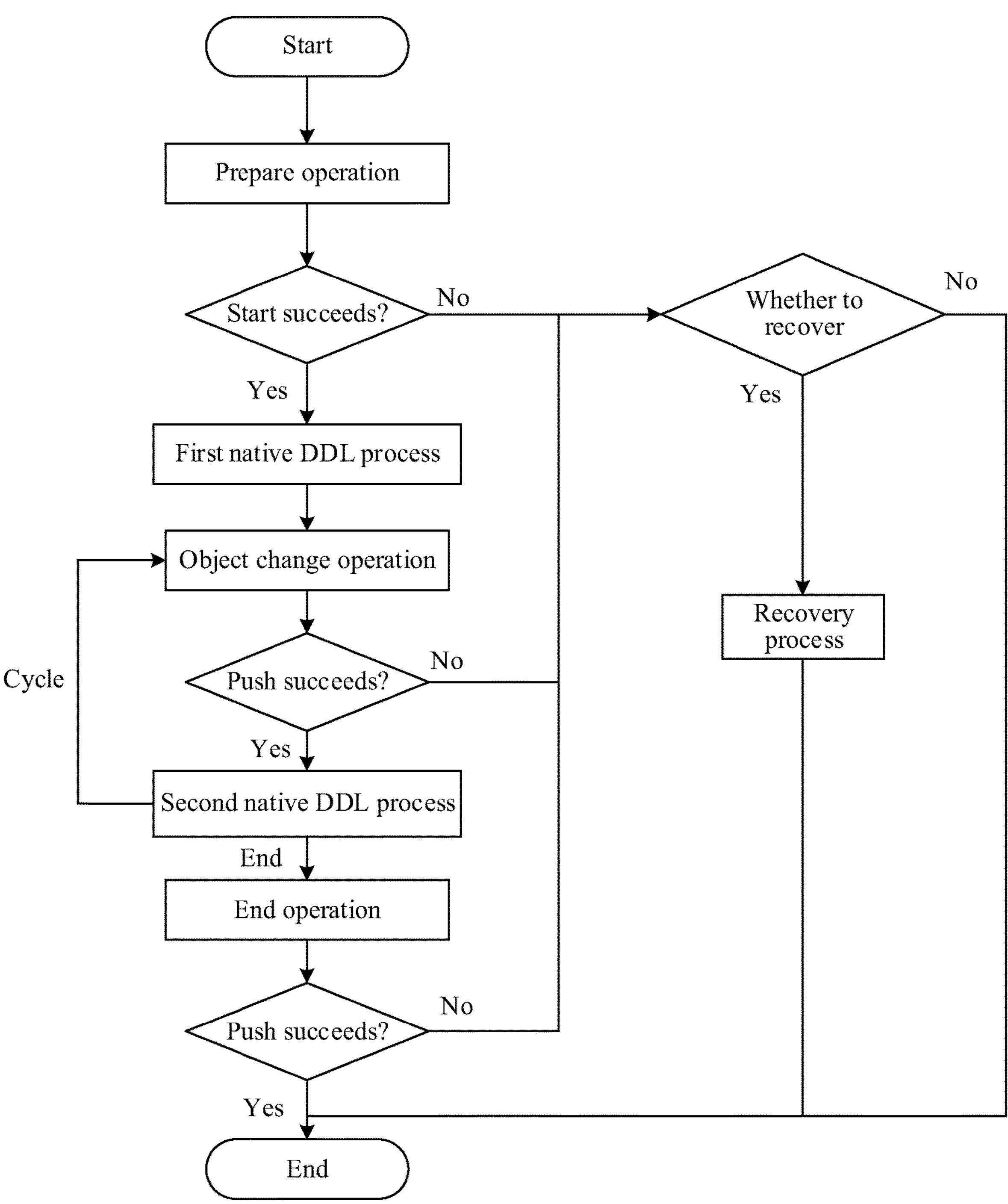
FIG. 6 is a schematic flowchart of an object processing method, according to another embodiment.

In some embodiments, when the object interaction request is the object change request, a prepare operation may also be executed before the target change operation on the target object, and an end operation may also be executed after the target change operation on the target object. Taking the target change operation being an operation corresponding to DDL as an example, the prepare operation may be referred to as start ddl_job, the end operation may be referred to as end_ddl_job, and the target change operation may be referred to as push_ddl_job. The execution of the prepare operation, the target change operation, and the end operation together may be as shown in FIG. 6. FIG. 6 is a schematic flowchart of the object processing method, according to some embodiments. The specific implementation process may be as follows: Execute the prepare operation, determine that start succeeds if the prepare operation is successfully executed, and enter an execution process of a first native DDL process. The first native DDL process may be a DDL process that needs to be executed from the prepare operation to the object change operation. Start to execute the object change operation when the first native DDL process is completed, and determine that push succeeds if the object change operation is successfully executed. Continue to execute a second native DDL process. The second native DDL process may be a DDL process that needs to be executed from the object change operation to the end operation. Start to execute the end operation when the second native DDL process is completed, determine that push succeeds if the end operation is successfully executed, and end the whole process. In addition, as shown in FIG. 6, whether recovery is required may be determined when a certain operation fails, and if recovery is required, a recovery flow is executed to recover to the status before the execution failure, so as to ensure the stability of the object change operation.

In some embodiments, any type of DDL may have a ddl record at the start of execution, that is, status information is recorded into ddl_job, aiming to clarify that DDL has been implemented in the system. ddl_job is the scene of the DDL for a recovery thread.

In some embodiments, in order to ensure that DML does not misread/miswrite data in the concurrent process with DDL, statuses of metadata and user data need to be continuously adjusted according to specific situations in the execution process of DDL. For example, DROP TABLE pushes the status of metadata to the delete-only status before actually deleting the user data, so as to prevent new transactions from reading user data that have been deleted. In a distributed database, the process of pushing the DDL status may be interrupted by any exceptions, such as network disk exceptions. Failure of any node of the push process means an execution failure of DDL. In this case, a background thread is required for recovery, and a recovery statement is ddl_job recorded in start ddl_job. ddl_job is continuously updated as pushing of the DDL state, and a valid field may be preserved for the recovery thread through the real-time property of ddl_job. When the DDL is completed, whether to keep or delete ddl_job needs to be determined based on whether the main execution process of the DDL throws an exception. If ddl_job is deleted, the DDL execution succeeds. Otherwise, the background recovery thread needs to perform a secondary determining.

Specifically, the function of push ddl job encapsulates all necessary statuses to push Schema from one status to the next status. Through the execution of this function, change of the DDL may be divided into successive small phases to be executed. For example, push_ddl_job may be used for pushing an execution status of the small phases of the DDL statement, may be an implementer of DDL phased execution, and as shown in FIG. 5, mainly may include the following functions:

1. Alter version information based on the latest data dictionary information, and alter the status and version of Schema in the data dictionary, which may be a conventional alter operation for the data dictionary; and in addition, check the meta-information.
2. Check whether object status transition complies with the logic through the status transition matrix when the meta-information passes the check, and status push may be performed only between allowed statuses.
3. Add/push the write fence phase.
4. Update the data dictionary.
5. Push a version identifier to save push information for failure recovery.

In some embodiments, the object change operations of this embodiment of the present disclosure may implement asynchronous delete of data. For example, when a computing node actually executes an insert operation for Schema, another computing node may delete a record in Schema in one operation. DROP and other operations in the DDL statement may be completed instantaneously. The background thread ensures data delete, and an actual delete action does not need to be executed in the same computing node as the DDL statement.

Figures 7, 8:
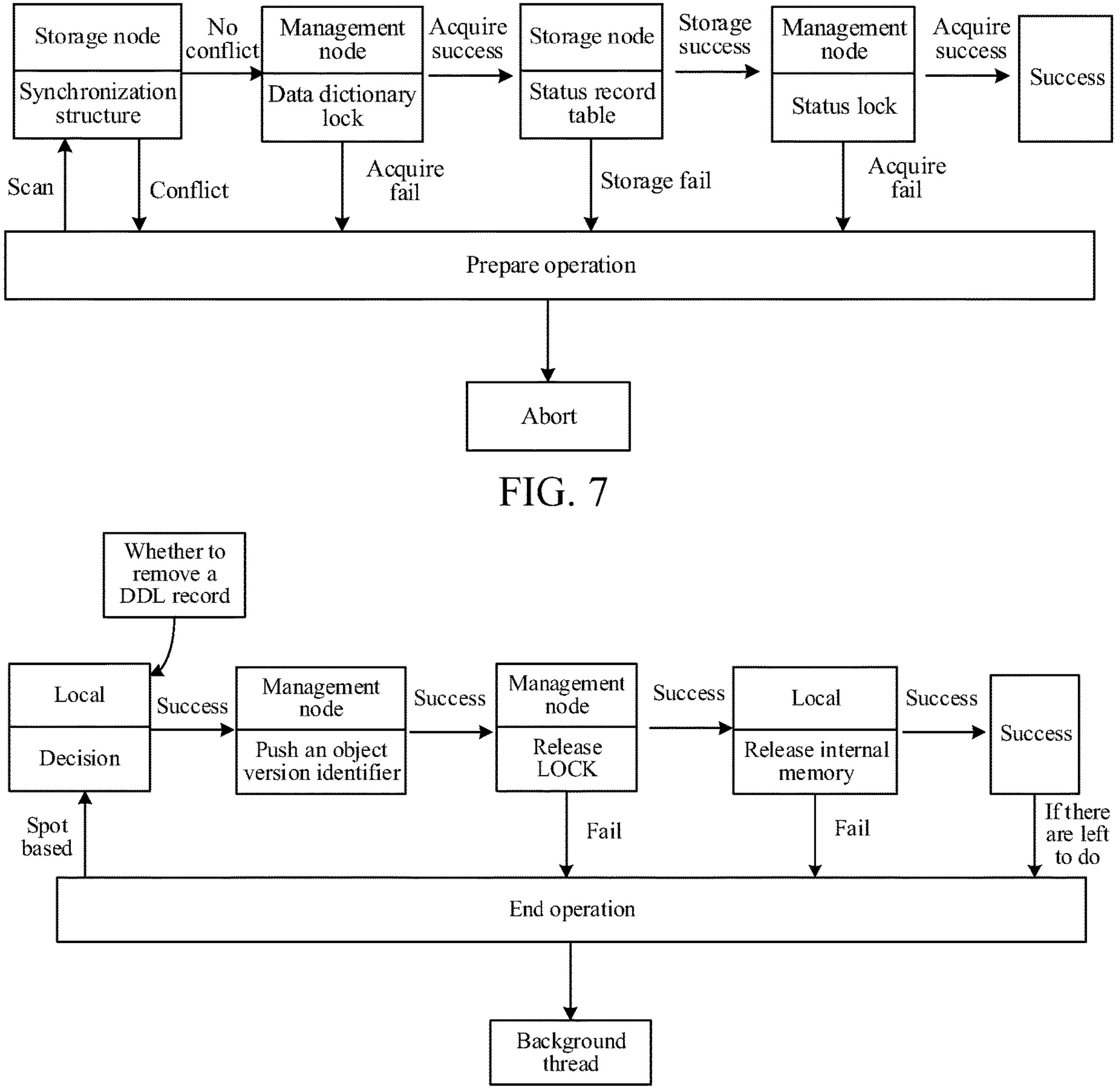
FIG. 7 is a schematic flowchart of a prepare operation, according to some embodiments.
FIG. 8 is a schematic flowchart of an end operation, according to some embodiments.

In some embodiments, there may be a specific implementation flow of the prepare operation, e.g., as shown in FIG. 7. start ddl_job is the beginning of SQL Engine executing a DDL statement, and as shown in FIG. 7, mainly may include the following functions:

1. Query a DDL synchronization structure, i.e. s may ddl_job, to determine that the global cluster is not executing a statement that conflicts with the current ddl. For example, execute an ALTER TABLE or DROP TABLE statement to obtain a conflict check result according to a statement execution result. Here is a first conflict check performed by using the storage layer to achieve concurrent control between DDL. If there is a conflict based on a s may result of ddl_job, abort execution of the DDL statement.
2. If there is no conflict based on the s may result of ddl_job, acquire a key (keyword) formed by a library name of the target object and register the key in a management node. The management node does not allow two duplicate values to be registered during the registration process. The MC may output a data dictionary lock (dd. table lock) when the registration succeeds. Here is a second conflict check performed by using a management of cluster layer to achieve concurrent control between DDL statements. If dd. table lock fails to be acquired, that is, registration fails, abort execution of the DDL statement.
3. If dd. table lock is successfully acquired, store current ddl status information in the status record table (ddl-_job table) for concurrency control and fault recovery. If logging into the ddl_job table fails, abort execution of the DDL statement.
4. Check whether a storage record in 3 exists. If yes, storage into ddl_job table succeeds, and a status lock (job id lock) is acquired from the management node so as to quickly judge a current execution status of the DDL. If the status lock fails to be acquired, the DDL is still executed in a normal process or has been recovered on other nodes. If the job-id lock fails to be acquired, abort execution of the DDL statement.
5. If the job-id lock is successfully acquired, determine start ddl_job as success.

In some embodiments, a specific implementation process of the end operation may be as shown in FIG. 8. Specifically, end_ddl_job is used for ending DDL execution and performing some after-works. The specific implementation process is described as follows:

1. The server locally decides whether to remove a DDL record from the ddl_job table based on the spot of the DDL. The removal basis is: whether to recover using the recovery thread or continue execution, and if yes, removal is not performed.
2. When the decision succeeds, the GLSV (the object version identifier) is pushed through the management node to inform other computing nodes that the statement for Schema has been completed.
3. When the GLSV push succeeds, release LOCK is executed, and global locks applied for in the execution process of the DDL are released through the management node. If release LOCK fails, recovery is performed using the background thread.
4. When release LOCK succeeds, release internal memory, i.e. release mem, is executed to release corresponding internal memory. If release internal memory fails, recovery is performed using the background thread.
5. If release internal memory succeeds, end_ddl_job is determined as success. In addition, if there are tasks left to do, recover using the background thread.

The phases divided in FIG. 5, FIG. 6, FIG. 7 and FIG. 8 may be understood as complete operation phases, and phase changes required for different operation types may be deleted in a targeted manner. For example, the delete operation does not require additional alter of data dictionary information.

In some embodiments, the execution situation of the DDL statement may be acquired by querying a DDL synchronous structure. A query result of the following query statement "select * from information_schema. ddl_job where is_history=1\G" may be as follows:

```
mysql> select * 4 from information_
schema.ddl_job where is_history = 1\G
SCHEMA_NAME: d1
TABLE_NAME: #
TABLE_VERSION: 0
DDL_STATUS: 0
START_TIMESTAMP: 2021-04-07 19:14:14
LAST_TIMESTAMP: 2021-04-07 19:14:14
DDL_SQL: create database dl
INFO:
{"exec_addr": {"ip":"127.0.0.1","port":9025},
"recov_addr":{"ip":"127.0.0.1","port": 9025}}
```

SCHEMA_NAME indicates a name of the target object, TABLE_NAME indicates a name of a certain table in the target object, TABLE_VERSION indicates a version of the table, DDL_STATUS indicates an execution status of a DDL statement, START_TIMESTAMP indicates a start time of executing the DDL statement, LAST_TIMESTAMP indicates an end time of executing the DDL statement, DDL_SQL is a DDL statement that is being executed, INFO indicates queried information, exec_addr indicates an execution machine address of DDL, ip indicates a corresponding Internet protocol (IP) address, port indicates a corresponding network interface, and recov_addr indicates a machine address where DDL execution is completed, and may include status information such as normal or abnormal.

The present disclosure further provides an application scenario, and the application scenario applies the above object processing method. Specifically, the application of the object processing method in the application scenario is as follows:

This embodiment of the present disclosure may be applied to distributed database systems, disaggregated computing and storage multi-write database cluster systems, and the like. The flow of executing the data definition language statement (DDL statement) once is shown in FIG. 9.

First, execute a start ddl_job phase. Next, execute a push_ddl_job phase. Finally, execute an end_ddl_job phase. The push_ddl_job phase is used for implementing the following functions: 1. Push a status to ensure visibility of the user data; 2. Record ddl push information to ensure recoverability at any node. The end_ddl_job phase is used for information preservation and other after-works. In the case of a normal termination, whether to keep a corresponding status record is determined based on whether a temporary table needs to be cleared. In addition, user data delete needs to be executed by the background thread, i.e. a DDL thread.

Figures 9, 10:
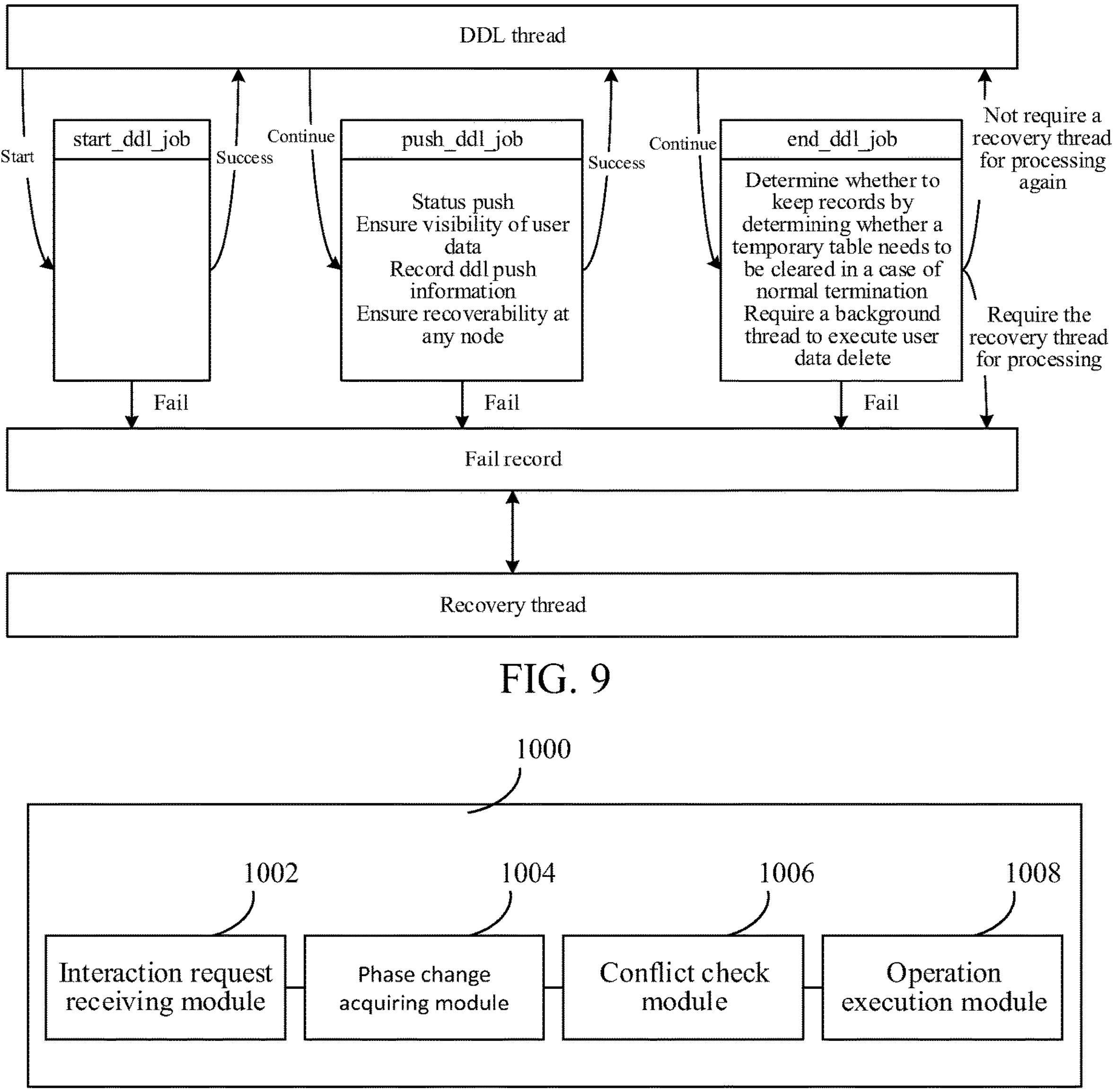
FIG. 9 is a schematic flowchart of execution of a data definition language statement, according to some embodiments.
FIG. 10 is a structural block diagram of an object processing apparatus, according to some embodiments.

As shown in FIG. 9, when a phase fails to be executed, a failure record may be generated and the status before the execution failure may be recovered through the recovery thread. The execution failure may be a program execution failure or a failure situation in which a system cannot operate, such as a power-off. Further, when the recovery thread is not needed for processing again, the DDL thread returns to an original state, and may handle other tasks. When the recovery thread is needed for processing, the corresponding status is recovered by the recovery thread, and the recovery thread may access ddl_job to acquire the status failed to be executed, so as to achieve status recovery. There is no need to worry about data problems caused by the DDL failure, because once the DDL fails to be executed, the background thread may perform recovery on the abnormal DDL to ensure the data consistency status.

For a DDL statement, strong synchronization of all the computing nodes is not required, and all the computing nodes perceive that one computing node is executing DDL statement by the following methods:

1. For the DDL statement, whether there are change statements for same Schema being still executed is checked by the management of cluster node and the storage node. Because the change process is stored in the storage node in the form of a task, the process of querying the task actually may include the check process. In addition, the write fence of the storage node ensures that the storage node prevents the execution of read and write operations that are not allowed during the DDL process.

2. For the completion of each small phase in the DDL statement, a cluster-level variable may be updated. When starting a new transaction, other nodes in the cluster may perform logic determining of subsequent execution based on a current phase change of Schema, and obtain the cluster-level variable. Whether to enter a Schema change determining process is determined according to the cluster-level variable value, and the following content is determined: whether a Schema change occurs to Schema of the current operation, what is changed, a current status of Schema, whether this status allows the execution of the current operation, etc. and the processing process is completed. Schema of the computing nodes is also updated to the latest status.

3. A logic table may be added to the data dictionary, that is, the status record table in the foregoing embodiment. How a statement is to be executed is determined during runtime by synchronizing statuses in the logic table. The logic table is accessible to all computing nodes in the computing node cluster, such that the statuses recorded in the logic table may be used as cluster-level variables. The logic table may be implemented via ddl_job, the DDL execution status may be obtained by querying ddl_job in the form of an SQL statement, and whether the current DDL is completed, a current execution operation, etc. may be determined via records of ddl_job. In addition, synchronization structures in the logic table and the digital dictionary may be different.

4. Assuming that the other nodes do not have corresponding Schema changes when starting to execute a transaction, in the process of execution, the data inconsistency problem caused by using an old version of Schema object to operate in the execution process of each node in the cluster may be prevented by persistent update of the Schema status in the Schema change process (write fence). A logic for judging whether the current version of the Schema object is compatible with an operation version when data is written into the storage layer is added to determine whether data write and read are allowed, so as to ensure that data write and read do not introduce data consistency and integrity problems. At the same time, a plurality of conflict resolution mechanisms are supported.

In addition, DDL is first, that is, DDL may always push the execution state, and other DML statement transactions may be rolled back in some statuses. Specifically, if a DDL statement needs to be executed during the execution of other DML statements, the DML statements are rolled back after the DDL statement is completed.

In conventional technology, only serial execution of DDL is implemented during implementation of distributed database DDL, and execution of DDL is allowed only on a particular node. In the embodiment, through subdivision of the execution phases, DDL statements may be executed on a plurality of nodes, that is, DDL may be executed on any computing node, and independent DDL may be executed in parallel, enabling multi-write.

Some embodiments may have the following beneficial effects:

1. The DDL statement execution performance in the distributed database is basically consistent with that in stand-alone My SQL (relational database management system).
2. Through DDL phased execution, and delay of processing object versions between different computing nodes, the impact on DML statements during DDL execution in a distributed system is maximized. The conventional execution mode of DDL statements is changed from direct change to a plurality of continuous and independent small operations, such that different computing nodes in the cluster may perceive the change status of Schema in an asynchronous manner. At the same time, when a computing layer initiates a read-write operation, the storage layer may judge whether a version status of the current operation object matches the latest Schema status of the cluster, so as to prevent data consistency problems of the read-write transaction caused by the DDL change.
3. The DDL statements are executed in phases, and other nodes may perform perception in time according to different phases, and may decide whether to continue to execute/roll back a transaction according to the current execution phase of DDL. Rollback transactions may be reduced to the minimum through fine division of states. The different computing nodes in the cluster perceive that the system is undergoing a DDL change statement currently through a non-lock mode, and the impact of the DDL statements on other computing nodes during execution may be minimized compared with strong synchronization implementation.
4. The user data is guaranteed by the write fence, even if cross-version data breaks the limit of phased DDL, the cross-version data may be found by the storage layer through the write fence, and the submission of transactions is denied, so as to avoid misread/miswrite.
5. A global control structure is realized through ddl_job to track DDL execution information, and the background recovery thread monitors the system table in real time. When the DDL statements fail to be executed in the distributed system, the metadata may still be recovered to a correct and consistent status to provide services to users.
6. Once the scenario of a DDL failure occurs, the background thread may perform rollback or push according to the execution information at the first time, so as to ensure that the whole distributed database system may enter another consistency status and recover the ability to provide external services.

It is to be understood that although the operations in the flowchart are sequentially shown according to indication of an arrow, the operations are not necessarily sequentially performed according to a sequence indicated by the arrow. Unless clearly specified in this specification, there is no strict sequence limitation on the execution of the operations, and the operations may be performed in another sequence. Moreover, at least some of the operations in the flowchart may include a plurality of operations or a plurality of stages. The operations or stages are not necessarily performed at the same moment but may be performed at different moments. The operations or stages are not necessarily performed sequentially, but may be performed in turn or alternately with another operation or at least some of operations or stages of the another operation.

Based on the same idea as the object processing method in the above embodiment, the present disclosure further provides an object processing apparatus. The apparatus may be used for executing the above object processing method. For convenience of description, in a schematic structural diagram of the object processing apparatus embodiment, only a part related to this embodiment of the present disclosure is shown. A person skilled in the art may understand that the structure shown in the figure does not constitute a limit on the apparatus, and the electronic device may include more or fewer components than those shown in the figure, or some components may be combined, or different component deployments may be used.

In some embodiments, as shown in FIG. 10, an object processing apparatus 1000 is provided. The apparatus may adopt a software module or a hardware module, or a combination of the two to form part of a computer device. The apparatus specifically may include: an interaction request receiving module 1002, a phase change acquiring module 1004, a conflict check module 1006, and an operation execution module 1008.

The interaction request receiving module 1002 is configured to receive an object interaction request for a target object.

The phase change acquiring module 1004 is configured to acquire, based on the object interaction request, a current phase change of a current change operation performed on the target object. The current change operation may include a plurality of operations. The current change operation is divided into a plurality of phase changes according to conflict operation types corresponding to the operations, and the conflict operation types are types of conflict operations corresponding to the operations.

The conflict check module 1006 is configured to determine, according to a target operation type corresponding to the object interaction request and a current relevant operation type corresponding to the current phase change, a conflict check result corresponding to the object interaction request. The target operation type is a type of a target interaction operation requested by the object interaction request.

The operation execution module 1008 is configured to execute, based on the conflict check result is that there is no conflict, the target interaction operation on the target object according to the object interaction request.

In the above object processing apparatus, by subdividing a change operation into phase changes, a conflict check may be performed in each phase change, operation phases without conflicts may run in parallel, and at the same time, operation phases with conflicts may be stopped, such that the influence of the change operation on other interaction operations may be greatly reduced, and the efficiency of object interaction processing may be effectively improved.

In some embodiments, the phase change acquiring module further may include: an operation acquiring sub-module, configured to acquire a current operation corresponding to the current change operation performed on the target object; and a phase change determining sub-module, configured to determine a phase change corresponding to the current operation as the current phase change of the current change operation performed on the target object. Successive operations of different conflict operation types are divided into different phase changes.

In some embodiments, the object processing apparatus further may include: an operation sequence determining module, configured to determine a current operation sequence corresponding to the current change operation, the current operation sequence including a plurality of operations arranged according to an operation order; a conflict type determining module, configured to determine conflict operation types corresponding to the operations in the current operation sequence; and an operation sequence division module, configured to divide the current operation sequence according to the conflict operation types corresponding to the operations to obtain a plurality of phase changes corresponding to the current change operation, successive operations of the same conflict operation type being in the same phase change.

In some embodiments, the current relevant operation type may include a current conflict operation type. The conflict check module may include: a first operation type determining sub-module, configured to extract an operation type identifier from the object interaction request, and obtain, according to the extracted operation type identifier, the target operation type corresponding to the object interaction request; and a first conflict check sub-module, configured to compare the target operation type with the current conflict operation type, and determine, based on determining that the current conflict operation type may include the target operation type according to a comparison result, that the conflict check result is that there is a conflict.

In some embodiments, the current relevant operation type may include a current parallel operation type. The conflict check module may include: a second operation type determining sub-module, configured to extract the operation type identifier from the object interaction request, and obtain, according to the extracted operation type identifier, the target operation type corresponding to the object interaction request; and a second conflict check sub-module, configured to compare the target operation type with the current parallel operation type, and determine, based on determining that the current parallel operation type does not include the target operation type according to a comparison result, that the conflict check result is that there is a conflict.

In some embodiments, the object processing apparatus further may include: an operation stop module, configured to stop, based on the conflict check result is that there is a conflict, executing the target interaction operation on the target object according to the object interaction request.

In some embodiments, the operation execution module may include: an operation sequence determining sub-module, configured to determine, based on the conflict check result is that there is no conflict, a target operation sequence corresponding to the target operation type based on the object interaction request; and an interaction operation execution sub-module, configured to execute the target interaction operation on the target object according to the target operation sequence.

In some embodiments, the interaction operation execution sub-module may include: a first operation phase determining unit, configured to determine a first operation phase corresponding to the target object, the first operation phase being a next operation phase corresponding to the object interaction request; a locking request transmitting unit, configured to transmit, based on a phase priority corresponding to the first operation phase meets a priority execution condition, an operation locking request for the target object, the operation locking request being used for triggering a computing node that is interacting with the target object to be added with a corresponding object lock, so as to be locked in a current operation performed on the target object until unlocked; and an operation execution unit, configured to execute, based on determining that locking response information for the operation locking request is received, an operation corresponding to the first operation phase, the locking response information being response information returned by the computing node after being added with the object lock.

In some embodiments, the object processing apparatus further may include: an operation phase determining module, configured to determine a second operation phase corresponding to the target object, the second operation phase being a next operation phase corresponding to the first operation phase; and an object lock maintaining module, configured to maintain, based on a phase priority corresponding to the second operation phase meets the priority execution condition, the object lock requested by the operation locking request, and execute an operation corresponding to the second operation phase.

In some embodiments, the locking request transmitting sub-module may include: a content level determining unit, configured to determine an operation content level of operation content corresponding to the first operation phase; and a locking request transmitting unit, configured to determine, based on the operation content level is an object level, that the phase priority corresponding to the first operation phase meets the priority execution condition, and transmit the operation locking request for the target object.

In some embodiments, the object processing apparatus further may include: a target version identifier determining module, configured to determine a target object version identifier corresponding to the object interaction request; a current version identifier determining module, configured to acquire a current object version identifier corresponding to the target object after the target object is changed according to the current change operation; and a version identifier comparison module, configured to compare the target object version identifier with the current object version identifier, and stop, based on determining that the target object version identifier and the current object version identifier are inconsistent through comparison, a response to the object interaction request.

In some embodiments, the current relevant operation type may include the current parallel operation type. The conflict check module may include: an operation type determining sub-module, configured to determine, based on the current phase change is an operation blocking information write phase, that the current parallel operation type corresponding to the current phase change is a delete operation type, the operation blocking information write phase being used for writing the current object version identifier corresponding to the target object after the target object is changed according to the current change operation; and a third conflict check sub-module, configured to determine, based on the target operation type does not match the delete operation type, that the conflict check result corresponding to the object interaction request is that there is a conflict.

For a specific limit on the object processing apparatus, reference may be made to the limit on the object processing method. Details are not described herein again. The modules in the foregoing object processing apparatus may be implemented entirely or partially by software, hardware, or a combination thereof. The foregoing modules may be built in or independent of one or more processors of a computer device in a hardware form, or may be stored in a memory of the computer device in a software form, so that the one or more processors invokes and performs an operation corresponding to each of the foregoing modules.

In some embodiments, a computer device is provided. The computer device may be a server, and an internal structure diagram thereof may be shown in FIG. 11. The computer device may include one or more processors, a memory, and a network interface connected through a system bus. The one or more processors of the computer device are configured to provide computing and control capabilities. The memory of the computer device may include a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store data such as a conflict check result. The network interface of the computer device is configured to communicate with an external terminal through a network connection. The computer-readable instruction is executed by the one or more processors to implement an object processing method.

Figure 11:
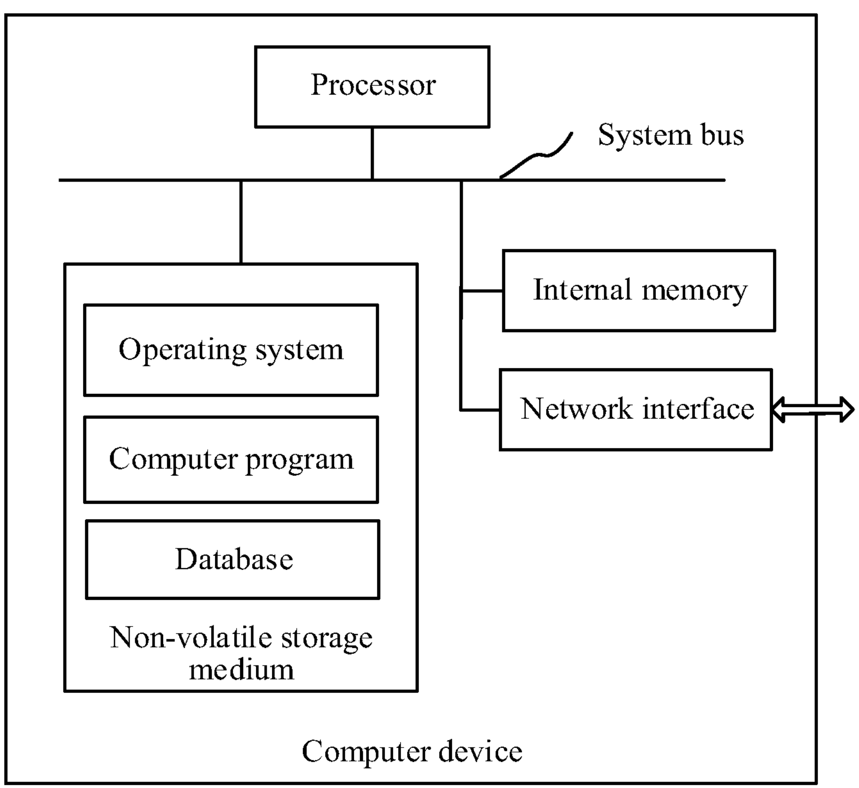
FIG. 11 is a diagram of an internal structure of a computer device according to some embodiments.

A person skilled in the art may understand that the structure shown in FIG. 11 is only a block diagram of a partial structure related to the solution of the present disclosure, and does not limit the computer device to which the solution of the present disclosure is applied. Specifically, the computer device may include more or fewer components than those shown in the figure, or some components may be combined, or a different component deployment is used.

In some embodiments, a computer device is further provided, including a memory and one or more processors, the memory storing computer-readable instructions, the computer-readable instructions, when executed by the processor, causing the one or more processors to implement a method according to some embodiments.

In some embodiments, one or more computer-readable storage media is provided, storing computer-readable instructions, the computer-readable instructions, when executed by one or more processors, implement the operations in the method embodiments.

In some embodiments, a computer program product is provided, the computer program product including computer-readable instructions, the computer-readable instructions being stored in a computer-readable storage medium. One or more processors of a computer device reads the computer-readable instructions from the computer-readable storage medium and executes the computer-readable instructions to cause the computer device to perform a method according to some embodiments.

A person of ordinary skill in the art may understand that some or all procedures in a method in some embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a storage, a database, or another medium used in the embodiments provided in the present disclosure may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache memory. As a description and not a limit, the RAM may be in a plurality of forms, such as a static random access memory (SRAM) or a dynamic random access memory (DRAM).

Technical features of some embodiments may be randomly combined. To make description concise, not all possible combinations of the technical features in the foregoing embodiments are described. However, the combinations of these technical features shall be considered as falling within the scope recorded by this specification provided that no conflict exists.

Some embodiments only describe several implementations of the present disclosure, which are described specifically and in detail, but cannot be construed as a limitation to the patent scope of the present invention. For a person of ordinary skill in the art, several transformations and improvements may be made without departing from the idea of the present disclosure. These transformations and improvements belong to the protection scope of the present disclosure. Therefore, the protection scope of the patent of the present disclosure shall be subject to the appended claims.

What is claimed is:

1. An object processing method, performed by a computer device, the method comprising:

receiving an object interaction request for a target object;

acquiring, based on the object interaction request, a current phase change of a current change operation performed on the target object, the current change operation comprising a plurality of operations, the current change operation being divided into a plurality of phase changes according to conflict operation types, which are types of conflict operations that correspond to the plurality of operations, wherein the acquiring the current phase change of the current change operation performed on the target object comprises:

acquiring a current operation corresponding to the current change operation performed on the target object, and determining a phase change corresponding to the current operation as the current phase change of the current change operation performed on the target object, successive operations of different conflict operation types being divided into different phase changes;

determining, according to a target operation type corresponding to the object interaction request and a current relevant operation type corresponding to the current phase change, a conflict check result corresponding to the object interaction request, the target operation type being a type of a target interaction operation requested by the object interaction request; and executing, based on the conflict check result indicating no conflict, the target interaction operation on the target object according to the object interaction request.

2. The method according to claim 1, further comprising:

determining a current operation sequence corresponding to the current change operation, the current operation sequence comprising a plurality of operations arranged according to an operation order;

determining conflict operation types corresponding to the plurality of operations in the current operation sequence; and dividing the current operation sequence according to the conflict operation types corresponding to the plurality of operations to obtain a plurality of phase changes corresponding to the current change operation, successive operations of a same conflict operation type being in a same phase change.

3. The method according to claim 1, wherein the current relevant operation type comprises a current conflict operation type; and the determining the conflict check result comprises:

extracting an operation type identifier from the object interaction request, and obtaining, according to the extracted operation type identifier, the target operation type corresponding to the object interaction request; and comparing the target operation type with the current conflict operation type, and determining, based on determining that the current conflict operation type comprises the target operation type according to a comparison result, that the conflict check result is that there is a conflict.

4. The method according to claim 1, wherein the current relevant operation type comprises a current parallel operation type; and wherein the determining the conflict check result comprises:

extracting an operation type identifier from the object interaction request, and obtaining, according to the extracted operation type identifier, the target operation type corresponding to the object interaction request; and comparing the target operation type with the current parallel operation type, and determining, based on determining that the current parallel operation type does not comprise the target operation type according to a comparison result, that the conflict check result is that there is a conflict.

5. The method according to claim 1, further comprising:

stopping, based on another conflict check result indicating a conflict, execution of the target interaction operation.

6. The method according to claim 1, wherein the executing the target interaction operation on the target object according to the object interaction request comprises:

determining a first operation phase corresponding to the target object, the first operation phase being a next operation phase corresponding to the object interaction request;

transmitting, based on a phase priority corresponding to the first operation phase satisfying a priority execution condition, an operation locking request for the target object, the operation locking request being used for triggering a computing node that is interacting with the target object to be added with a corresponding object lock, so as to be locked in a current operation performed on the target object until unlocked; and executing, based on determining that locking response information for the operation locking request is received, an operation corresponding to the first operation phase, the locking response information being response information returned by the computing node after being added with the object lock.

7. The method according to claim 6, further comprising:

determining a second operation phase corresponding to the target object, the second operation phase being a next operation phase corresponding to the first operation phase; and maintaining, based on a phase priority corresponding to the second operation phase satisfying the priority execution condition, the object lock requested by the operation locking request, and executing an operation corresponding to the second operation phase.

8. The method according to claim 6, wherein the transmitting the operation locking request for the target object comprises:

determining an operation content level of operation content corresponding to the first operation phase; and determining, based on the operation content level being an object level, that the phase priority corresponding to the first operation phase meets the priority execution condition, and transmitting the operation locking request for the target object.

9. The method according to claim 1, further comprising:

determining a target object version identifier corresponding to the object interaction request;

acquiring a current object version identifier corresponding to the target object after the target object is changed according to the current change operation; and comparing the target object version identifier with the current object version identifier, and stopping, based on determining that the target object version identifier and the current object version identifier are inconsistent through comparison, a response to the object interaction request.

10. The method according to claim 1, wherein the current relevant operation type comprises a current parallel operation type; and the determining the conflict check result comprises:

determining, based on the current phase change being an operation blocking information write phase, that the current parallel operation type corresponding to the current phase change is a delete operation type, the operation blocking information write phase being used for writing a current object version identifier corresponding to the target object after the target object is changed according to the current change operation; and determining, based on the target operation type not matching the delete operation type, that the conflict check result corresponding to the object interaction request is that there is a conflict.

11. The method according to claim 1, wherein the executing, based on the conflict check result indicating no conflict, the target interaction operation on the target object according to the object interaction request comprises:

determining, based on the conflict check result indicating no conflict, a target operation sequence corresponding to the target operation type based on the object interaction request; and executing the target interaction operation on the target object according to the target operation sequence.

12. An object processing apparatus, the apparatus comprising:

at least one memory configured to store program code; and at least one processor configured to read the program code and operate as instructed by the program code, the program code comprising:

interaction request receiving code configured to cause the at least one processor to receive an object interaction request for a target object;

phase change acquiring code configured to cause the at least one processor to acquire, based on the object interaction request, a current phase change of a current change operation performed on the target object, the current change operation comprising a plurality of operations, the current change operation being divided into a plurality of phase changes according to conflict operation types, which are types of conflict operations that correspond to the plurality of operations, wherein the phase change acquiring code comprises:

operation acquiring code configured to cause the at least one processor to acquire a current operation corresponding to the current change operation performed on the target object; and phase change determining code configured to cause the at least one processor to determine a phase change corresponding to the current operation as the current phase change of the current change operation performed on the target object, wherein successive operations of different conflict operation types are divided into different phase changes;

conflict check code configured to cause the at least one processor to determine, according to a target operation type corresponding to the object interaction request and a current relevant operation type corresponding to the current phase change, a conflict check result corresponding to the object interaction request, the target operation type being a type of a target interaction operation requested by the object interaction request; and operation execution code configured to cause the at least one processor to execute, based on the conflict check result indicating no conflict, the target interaction operation on the target object according to the object interaction request.

13. A non-transitory computer-readable storage medium, storing computer code that, when executed by at least one processor, causes the at least one processor to:

receive an object interaction request for a target object;

acquire, based on the object interaction request, a current phase change of a current change operation performed on the target object, the current change operation comprising a plurality of operations, the current change operation being divided into a plurality of phase changes according to conflict operation types, which are types of conflict operations that correspond to the plurality of operations, wherein the current phase change of the current change operation performed on the target object is acquired by:

acquiring a current operation corresponding to the current change operation performed on the target object, and determining a phase change corresponding to the current operation as the current phase change of the current change operation performed on the target object, successive operations of different conflict operation types being divided into different phase changes;

determine, according to a target operation type corresponding to the object interaction request and a current relevant operation type corresponding to the current phase change, a conflict check result corresponding to the object interaction request, the target operation type being a type of a target interaction operation requested by the object interaction request; and execute, based on the conflict check result indicating no conflict, the target interaction operation on the target object according to the object interaction request.

14. The non-transitory computer-readable storage medium according to claim 13, wherein the computer code, when executed by the at least one processor, further causes the at least one processor to:

determine a current operation sequence corresponding to the current change operation, the current operation sequence comprising a plurality of operations arranged according to an operation order;

determine the conflict operation types corresponding to the plurality of operations in the current operation sequence; and divide the current operation sequence according to the conflict operation types corresponding to the plurality of operations to obtain a plurality of phase changes corresponding to the current change operation, successive operations of a same conflict operation type being in a same phase change.

15. The non-transitory computer-readable storage medium according to claim 13, wherein the current relevant operation type comprises a current conflict operation type; and wherein the computer code, when executed by the at least one processor, further causes the at least one processor to:

extract an operation type identifier from the object interaction request, and obtaining, according to the extracted operation type identifier, the target operation type corresponding to the object interaction request; and compare the target operation type with the current conflict operation type, and determining, based on determining that the current conflict operation type comprises the target operation type according to a comparison result, that the conflict check result is that there is a conflict.

16. The non-transitory computer-readable storage medium according to claim 13, wherein the current relevant operation type comprises a current conflict operation type; and wherein the computer code, when executed by the at least one processor, further causes the at least one processor to:

extract an operation type identifier from the object interaction request, and obtaining, according to the extracted operation type identifier, the target operation type corresponding to the object interaction request; and compare the target operation type with the current parallel operation type, and determine, based on determining that the current parallel operation type does not comprise the target operation type according to a comparison result, that the conflict check result is that there is a conflict.

17. The non-transitory computer-readable storage medium according to claim 13, wherein the computer code, when executed by the at least one processor, further causes the at least one processor to:

stop, based on another conflict check result indicating a conflict, execution of the target interaction operation.

* * * * *